(12) United States Patent
Keshavarz et al.

(10) Patent No.: US 11,495,831 B2
(45) Date of Patent: *Nov. 8, 2022

(54) ELECTROCHEMICAL CELL WITH TMCCC ELECTRODES IN AN ACETONITRILE SOLVENT INCLUDING A DINITRILE ADDITIVE

(71) Applicant: Natron Energy, Inc., Santa Clara, CA (US)

(72) Inventors: Majid Keshavarz, Pleasanton, CA (US); Daniel Friebel, San Carlos, CA (US); Peter Benjamin Herman, San Jose, CA (US); Grace Marjorie Yee, San Francisco, CA (US); Alex J. Klevay, San Jose, CA (US)

(73) Assignee: Natron Energy, Inc., Santa Clara ( * ) Notice: Subject to any disclaimer, the term of this patent is extended or adjusted under 35 U.S.C. 154(b) by 0 days.

This patent is subject to a terminal disclaimer.

(21) Appl. No.: 17/650,370

(22) Filed: Feb. 8, 2022

(65) Prior Publication Data

US 2022/0166068 A1    May 26, 2022

Related U.S. Application Data

(63) Continuation of application No. 16/898,692, filed on Jun. 11, 2020, now Pat. No. 11,283,109.

(51) Int. Cl.
*H01M 10/0567* (2010.01)
*H01M 10/0569* (2010.01)

(52) U.S. Cl.
CPC ... *H01M 10/0567* (2013.01); *H01M 10/0569* (2013.01); *H01M 2300/0028* (2013.01)

(58) Field of Classification Search
None
See application file for complete search history.

(56) References Cited

U.S. PATENT DOCUMENTS

| | | | |
|---|---|---|---|
| 5,418,682 A | 5/1995 | Warren, Jr. et al. | |
| 9,666,906 B2 | 5/2017 | Ho et al. | |
| 11,283,109 B1 * | 3/2022 | Keshavarz | H01M 10/0567 |

(Continued)

FOREIGN PATENT DOCUMENTS

WO     2008/138132 A1    11/2008

OTHER PUBLICATIONS

Q. Zhang et al., "Safety-Reinforced Succinonitrile-Based Electrolyte with Interfacial Stability for High-Performance Lithium Batteries" Appl. Mater. Interfaces 2017, 9 (35), 29820.

(Continued)

*Primary Examiner* — Lucas J. O'Donnell
(74) *Attorney, Agent, or Firm* — Patent Law Offices of Michael E. Woods; Michael Woods

(57) ABSTRACT

A system and method for a liquid electrolyte used in secondary electrochemical cells having at least one electrode including a TMCCC material, the liquid electrolyte enabling an increased lifetime while allowing for fast discharge to extremely high depth of discharge. The addition of dinitriles to liquid electrolytes in electrochemical cells in which energy storage is achieved by ion intercalation in transition metal cyanide coordination compounds (TMCCC) has the advantage of increasing device lifetime by inhibiting common chemical and electrochemical degradation mechanisms.

9 Claims, 15 Drawing Sheets

(56) References Cited

U.S. PATENT DOCUMENTS

2014/0308544 A1* 10/2014 Wessells .............. H01M 4/485
429/188
2015/0263383 A1  9/2015 Lu et al.
2019/0312299 A1  10/2019 Palani et al.

OTHER PUBLICATIONS

H. Duncan et al., "Electrolyte Formulations Based on Dinitrile Solvents for High Voltage Li-Ion Batteries" J. Electrochem. Soc. 2013, 160 (6), A838.

A. Abouimrane et al., "Investigation of Li salt doped succinonitrile as potential solid electrolytes for lithium batteries" J. Power Sources 2007, 174, 883.

T. A. Pham et al., "Solvation and Dynamics of Sodium and Potassium in Ethylene Carbonate from Ab Initio Molecular Dynamics Simulations" J. Phys. Chem. C 2017, 121 (40), 21913.

Y. Yamada et al., "Unusual Stability of Acetonitrile-Based Superconcentrated Electrolytes for Fast-Charging Lithion-Ion Batteries" J. Am. Chem. Soc. 2014, 136, 5039-5054.

N.D. Trinh et al., "An Artificial Lithium Protective Layer that Enables the Use of Acetonitrile-Based Electrolytes in Lithium Metal Batteries" Angew. Chem. Int. Ed. 2018, 57, 5072-5075.

D.A.Stevens et al., "The Mechanisms of Lithium and Sodium Insertion in Carbon Materials," Journal of The Electrochemical Society, 148 (8) A803-A811 (2001).

Journal of Physical Chemistry 2016, Rohan et al. Dinitrile-Mononitrile-Based Electrolyte System for Lithium-Ion Battery Application with the Mechanism of Reductive Decomposition of Mononitriles (Year 2016).

Y. Tian et al., "Promises and Challenges of Next-Generation "Beyond Li-Ion" Batteries for Electric Vehicles and Grid Decarbonization" Chem. Rev. 2021, 121, 1623-1669.

* cited by examiner

ELECTROCHEMICAL CELL WITH TMCCC ELECTRODES IN AN ACETONITRILE SOLVENT INCLUDING A DINITRILE ADDITIVE

CROSS REFERENCE TO RELATED APPLICATIONS

This Application is a Continuation of application Ser. No. 16/898,692 filed on Jun. 11, 2020, and is related to Application PCT/US21/37102 filed on Jun. 11, 2021, the contents of each of these applications are hereby expressly incorporated by reference thereto in their entireties for all purposes.

FIELD OF THE INVENTION

The present invention relates generally to improvement in secondary electrochemical cells, and more specifically, but not exclusively, to increasing device lifetime through inhibition of one or more degradation mechanisms in a rechargeable electrochemical device having at least one electrode including a transition metal cyanide coordination compound (TMCCC) material.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

It is recognized in electrochemistry that it is unlikely that there will be a single battery that works optimally for every application. Selecting the right battery for an application is about identifying the most important battery metrics and trading these off against others. For instance, when one desires a lot of power for an application, cell internal resistance is often minimized, and this may be done by increasing electrode surface area. But this also increases inactive components such as current collectors and conductive aid, so energy density could be traded off to gain power.

Important considerations may include metrics such as flexibility, safety, energy density, power density, voltage, cost, shelf life, operational life, form factor (e.g., thickness), commercial availability, temperature range, and cycle life.

Research, development, and manufacture of various battery configurations focus on increasing selected subsets of these metrics which may include particular tuning for specific applications. Specialization of batteries have allowed for improved batteries for a wide range of applications.

As a consequence, the components of any particular battery are tailored for the desired solution which often means that one component in one battery solution may not perform similarly in another battery solution.

Discussed herein is a class of secondary electrochemical cells that include a transition metal cyanide coordination compound (TMCCC) material. More specifically, this class of electrochemical cell includes liquid electrolytes in which energy storage is achieved by ion intercalation in one or more electrodes including the TMCCC material.

Performance of this class of electrochemical cell may implicate a rate of parasitic reactions during operation of the cell. Some solutions may include operation within a narrower voltage window in order to diminish the rate of parasitic reactions that result in cell degradation. However, this alternative results in a low utilization of the energy stored by the cell. Operating electrochemical devices within a narrower voltage window may result in significantly diminished energy.

Performance of this class of electrochemical cell is related to the composition of the liquid electrolytes. When one liquid electrolyte includes an undesirable rate of parasitic reactions, one solution may be to substitute a different liquid electrolyte that reduces the rate of parasitic reactions. However, that substituted liquid electrolyte may alter performance, such as decreasing electrolyte conductivity which may lower maximum charge and discharge power. Electrolytes with an entirely different solvent system, including most polar-aprotic solvents other than acetonitrile as the primary solvent, are disadvantageous because their ionic conductivity is significantly lower than that of electrolytes containing acetonitrile, and therefore precludes their application when high rate capability is desired.

It may be advantageous to implement a new class of liquid electrolyte for secondary electrochemical cells having at least one electrode including a TMCCC material.

BRIEF SUMMARY OF THE INVENTION

Disclosed is a system and method for a liquid electrolyte used in secondary electrochemical cells having at least one electrode including a TMCCC material, the liquid electrolyte enabling an increased lifetime while allowing for fast discharge to extremely high depth of discharge. The following summary of the invention is provided to facilitate an understanding of some of the technical features related to secondary electrochemical cells including at least one TMCCC electrode and is not intended to be a full description of the present invention. A full appreciation of the various aspects of the invention can be gained by taking the entire specification, claims, drawings, and abstract as a whole. The present invention is applicable to other configurations of electrochemical cells and components in addition to the examples discussed and disclosed herein. For example, other electrode materials of an electrochemical cell that may be considered "wet" that may contribute significant quantities of water, in the context of that cell chemistry, to the cell during operation.

A class of additives for liquid electrolytes in electrochemical cells having an anode electrode and a cathode electrode, in which the electrolyte salt is an alkali metal salt and at least one of the two electrodes contains a TMCCC material capable of intercalation and deintercalation reactions with alkali metal cations.

Some liquid electrolytes may include solutions of an alkali metal salt, or a mixture of several different alkali metal salts, and a dinitrile additive, in a mononitrile solvent.

An electrochemical cell including an electrolyte; an anode electrode in electrical communication with the electrolyte; and a cathode electrode in electrical communication with the electrolyte; wherein at least one the electrode includes a transition metal cyanide coordination compound material; and wherein the electrolyte includes a mononitrile solvent, one or more alkali metal salts in solution with the solvent, and an additive disposed within the solvent; and wherein the additive includes a dinitrile material.

A liquid electrolyte for a secondary electrochemical cell having at least one electrode including a transition metal cyanide coordination material, including a mononitrile solvent; and a dinitrile additive disposed within the mononitrile solvent.

An embodiment of an electrochemical cell, including an electrolyte; an anode electrode in electrical communication with the electrolyte; and a cathode electrode in electrical communication with the electrolyte; wherein the cathode electrode includes a first transition metal cyanide coordination compound material; and wherein the electrolyte includes an organic solvent, a salt in solution with the solvent, and an additive disposed within the solvent; wherein the salt includes an alkali cation and a polyatomic anion including fluoride; and wherein the additive includes a dinitrile material.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
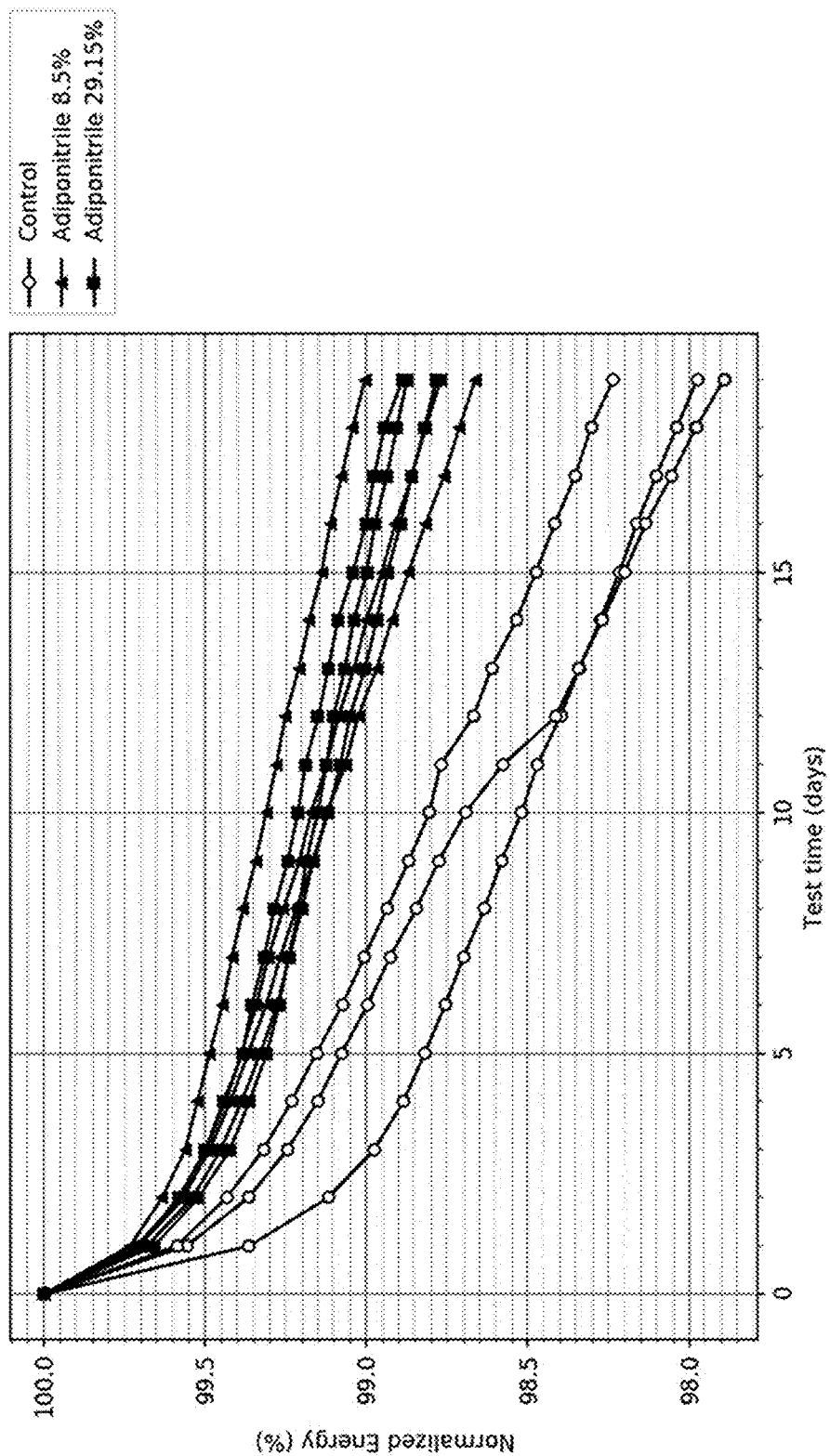
FIG. 1 illustrates cell energy versus time during float testing.

Embodiments of the present invention provide a system and method for a liquid electrolyte used in secondary electrochemical cells having at least one electrode including a TMCCC material, the liquid electrolyte enabling an increased lifetime while allowing for fast discharge to extremely high depth of discharge. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

As used herein, the term "dinitrile" means an organic chemical compound containing two, but not more than two, nitrile groups. A nitrile is any organic compound that include a —C≡N functional group (for purposes of this disclosure, the prefix cyano- may be used interchangeably with the term nitrile). For purposes of this application, a term "polynitrile" may be used to identify materials including two or more nitrile groups, with polynitrile materials including dinitrile materials while excluding mononitrile (a single nitrile group) materials. As further described herein, the mononitrile solvent and the dinitrile additives are desirable, purposeful, and functional and are present in sufficient quantities designed to meet design goals for the reduction of a rate of parasitic reactions resulting from water leaving an electrode during operation. This is distinguished from any situation in which the nitrile groups are viewed as undesirable, unpurposeful, and degrading such as a trace or impurity that decreases desired performance or other cell metric.

Disclosed herein is a new class of liquid electrolytes that enable increased lifetime of electrochemical energy storage devices, while at the same time allowing for fast discharge to extremely high depth of discharge. Electrolytes containing dinitrile additives were found to have several advantages, including: (i) in electrochemical devices that suffer degradation due to leaching of transition metal ions from electrode materials, the formation of transition metal oxide precipitates that degrade cell performance is diminished; (ii) in electrochemical devices that degrade due to the presence of water impurities, which are difficult to remove from common electrode materials, electrolyte solvents and electrolyte salts, unwanted reactions between nitrile-containing electrolyte solvents and water are suppressed by dinitrile additives. These effects are demonstrated herein with a unique sodium-ion battery in which at least one electrode material contains a significant concentration of water as part of its crystal lattice, some of which is released while the device is operated. With regards to dramatically enhancing the tolerance of electrochemical cells to water impurities, some of the examples provide a multitude of advantages, including significant cost savings in cell manufacturing processes that often require time-consuming and energy-intensive drying protocols and construction of controlled processing environments such as dry rooms and glove boxes around entire assembly lines, and opportunities for novel electrode materials for which full dehydration is highly disadvantageous or unfeasible.

Literature includes a discussion of certain uses of acetonitrile-dinitrile solvent mixtures. For example, in electrolytes for electric double layer capacitors (EDLC), see R1, and in Li-ion batteries, see R2-R6. Therein, benefits such as high ionic conductivity, stability of nitrile and dinitrile solvents across wide electrochemical potential windows, and enhanced safety against thermal runaway and fire due to the low vapor pressures of dinitriles, appear to have been described. However, those discussions appear to be limited to electrochemical structures containing ceramic or carbonaceous electrodes that are designed to be anhydrous (while water is an undesirable impurity, a certain quantity of water may be tolerated as an impurity), and do not show an improvement in cell stability performance as a result of the addition of a dinitrile species to the electrolyte.

The examples provided below disclose electrochemical structures and components that may afford significantly improved calendar and cycle lifetime for an electrochemical device. The examples describe novel and non-obvious elements that are unique in design.

The examples include TMCCC electrode materials used in this device that allow for fast ion transport and, during charge and discharge, undergo either no phase transitions at all, or only subtle structure changes. Therefore, these examples may offer much higher rate capability and much longer cycle life, even when cycled repeatedly to extremely high depth of discharge.

The degradation mechanism of the devices described in the examples is different from typical degradation mechanisms in Li-ion battery cells or in EDLCs, and the beneficial effect of dinitrile additives in cells containing TMCCC electrode material cannot be inferred from any of the benefits claimed in prior art disclosing electrolytes containing dinitriles in Li-ion cells or EDLCs. In particular, a new method of mitigating cell degradation mechanisms is described in which solvent molecules are decomposed within their nominal electrochemical stability window through reaction steps such as hydrolysis that do not involve solvent reduction or oxidation.

More generally, interactions between liquid nitrile-based electrolytes and electrode materials that intercalate other ions than $Li^+$, such as the larger alkali metal ions $Na^+$, $K^+$, $Rb^+$, or $Cs^+$ have not been addressed. Intercalation mechanisms and ion-solvent interactions are fundamentally different between $Li^+$ and larger alkali metal cations, due to the unique small ionic radius of $Li^+$ (R7).

Some examples herein include a new class of additives for liquid electrolytes in electrochemical cells having an electrolyte including a solvent and an electrolyte salt, an anode electrode, and a cathode electrode, in which the electrolyte salt includes an alkali metal salt and at least one of the two electrodes includes a TMCCC material capable of intercalation and deintercalation reactions with alkali metal cations in the electrolyte.

The liquid electrolytes may include solutions of an alkali metal salt, or a mixture of several different alkali metal salts, and a dinitrile additive, in a mononitrile solvent. Preferred examples of alkali metal salts include suitable salts containing an alkali metal cation and an anion, wherein the alkali metal cation is sodium, potassium, rubidium or cesium, and anions include, but are not limited to, perchlorate, tetrafluoroborate, hexafluorophosphate, difluoro-oxalatoborate, triflate, bis(trifluoromethanesulfonyl)imide, dicyanamide, tricyanomethanide, and mixtures thereof. Preferred examples of sodium salts include sodium salts such as, but not limited to, sodium perchlorate, sodium tetrafluoroborate, sodium hexafluorophosphate, sodium difluoro-oxalatoborate, sodium triflate, sodium bis(trifluoromethanesulfonyl)imide, sodium dicyanamide, and sodium tricyanomethanide, and mixtures thereof. A preferred sodium salt includes sodium bis(trifluoromethanesulfonyl)imide. Examples of dinitrile additives include malononitrile, succinonitrile, glutaronitrile, and adiponitrile. Additives of note include succinonitrile and adiponitrile, with succinonitrile particularly noteworthy in some cases. Examples of mononitrile solvents include acetonitrile, propionitrile and butyronitrile. The mass ratios of mononitrile solvent and dinitrile may range from approximately 99:1 to 70:30 with suitable salt concentrations that result in a liquid solution at a desired operating temperature. The operating temperature may be between −60° C. and +80° C., or a narrower scope of temperatures within this range as needed or desired.

Other organic electrolyte solvents that are electrochemically inactive in the operating electrochemical potential range of the TMCCC electrode and the counter electrode may be used in a practical cell. These solvents include nitriles such as succinonitrile or propionitrile, carbonates including propylene carbonate or dimethyl carbonate, sulfones including sulfolane and dimethyl sulfone, sulfoxides including dimethyl sulfoxide, amides including dimethylformamide, ethers including glymes including diglyme, triglyme, tetraglyme, 1,4-dioxane, or 1,3-dioxolane, lactones including gamma-valerolactone, glycol ethers including methylene glycol monoethylether, or other solvents, or a combination thereof. Other electrolyte salts that are soluble in the electrolyte solvent and that are electrochemically inactive in the operating electrochemical potential range of the TMCCC electrode and the counter electrode may be used in a practical cell. These salts may include sodium hexafluorophosphate, sodium tetrafluoroborate, sodium perchlorate, sodium (trifluoromethane)sulfonimide, sodium 4,5-dicyano-2-(trifluoromethyl)imidazolide, or other sodium salts, or a combination thereof. Furthermore, as the TMCCC electrode or its counterelectrode may undergo electrochemical reactions with other cations such as lithium, potassium, or magnesium, these salts may include lithium, potassium, or magnesium salts of tetrafluoroborate, perchlorate, (fluoromethane)sulfonimide, (trifluoromethane)sulfonimide, 4,5-dicyano-2-(trifluoromethyl)imidazolide, or a combination thereof.

Mass ratios with relatively high dinitrile content result in a greater enhancement of cell lifetime than those with lower dinitrile content as shown for adiponitrile and succinonitrile in Examples 1 and 2, respectively, whereas initial electrolyte conductivity increases with acetonitrile content, due to the low viscosity of acetonitrile. Preferred mass ratios of acetonitrile and dinitrile are in the range from 99:1 to 75:25. Particularly preferred mass ratios are between 95:5 and 80:20 for some of the applications described herein.

One mechanism by which dinitrile additives may enhance cell life most is chelation of dissolved transition metal ions by the individual dinitrile molecules. Side chemical reactions between the electrodes and electrolyte that result in dissolved transition metal ions are commonly observed with cathode materials in lithium-ion and sodium-ion batteries, especially with cathode materials containing manganese cations. In addition to cathode materials that are made of mixed transition metal oxides, electrode materials consisting of transition metal cyanide coordination compound (TMCCC) materials are also subject to partial transition metal dissolution reactions. Most commonly, TMCCC materials will react with the electrolyte to release manganese or iron cations into the electrolyte. The presence of a dinitrile electrolyte additive may result in a formation of a chemically stable chelation complex of one or more dinitrile molecules with the dissolved transition metal ions, which may decrease a reactivity of these ions towards other cell components.

Another possible advantage of electrolytes having compositions that include one or more dinitrile additives may be an enhanced tolerance of the electrochemical device towards water impurities. Degradation mechanisms that involve unwanted reactions with water can be exacerbated in battery cells that use TMCCC electrodes, because TMCCC electrodes typically contain significant amounts of intercalated and/or coordinated water molecules, potentially a significant quantity of which may be released during operation of the electrochemical cell including such electrodes. The release of these water molecules from the TMCCC electrodes may result in significant concentrations of water being present in the electrolyte of thousands to tens of thousands of parts per million, even in an event when the electrochemical cell is initially constructed with anhydrous liquid electrolyte prior to operation.

FIG. 1 illustrates cell energy versus time during float testing at 1.86V with daily 1 hour discharge to 1.19V at an ambient temperature of 40° C., normalized to the discharge energy of the first tested cycle, for cells containing a sodium manganese iron hexacyanoferrate cathode, a sodium manganese hexacyanomanganate anode, and acetonitrile-based electrolyte with no additive (Control) and various concentrations of adiponitrile.

Figure 2:
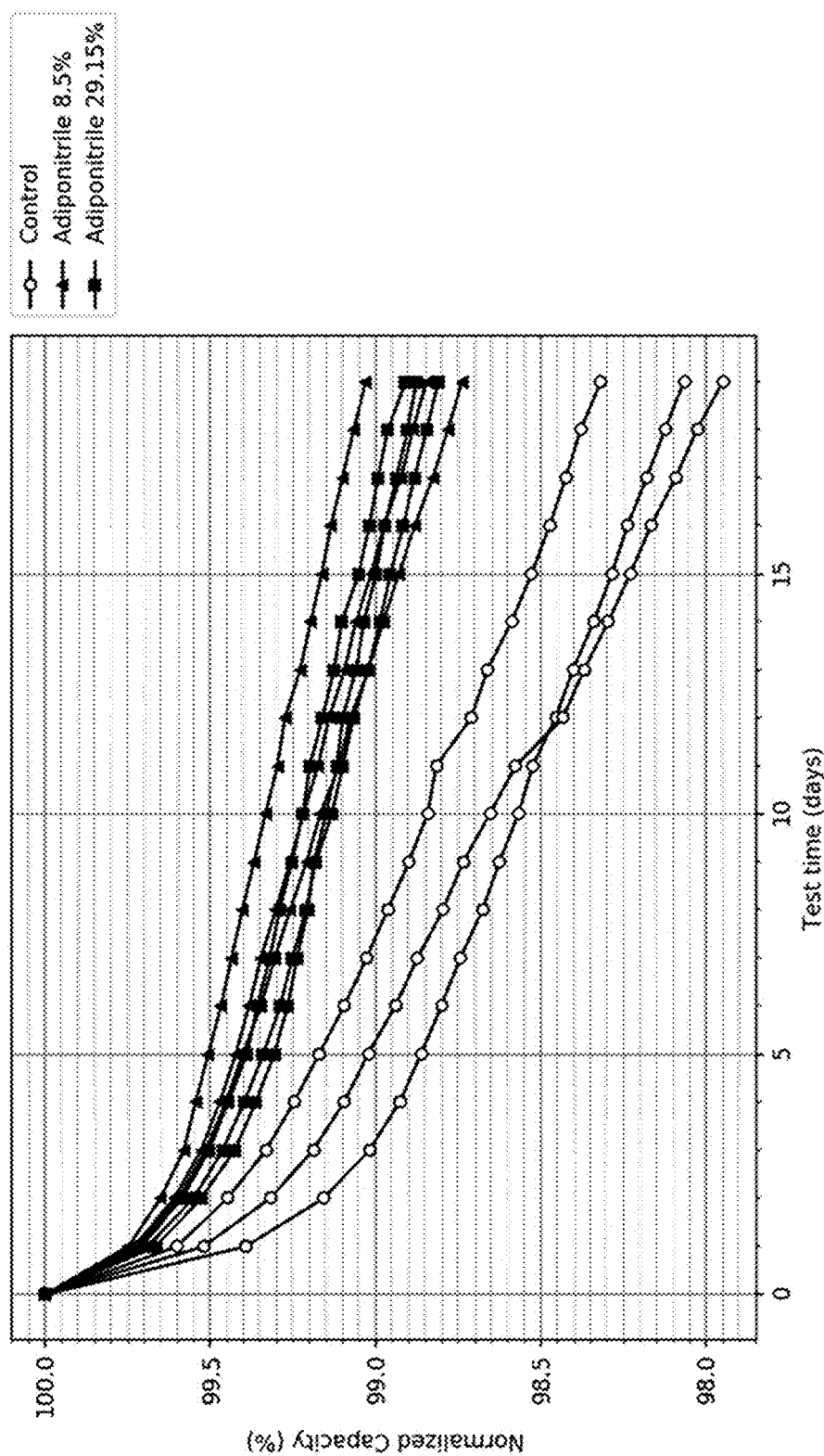
FIG. 2 illustrates cell capacity versus time during float testing.

FIG. 2 illustrates cell capacity versus time during float testing at 1.86V with daily 1 hour discharge to 1.19V at an ambient temperature of 40° C., normalized to the discharge capacity of the first tested cycle, for cells containing a sodium manganese iron hexacyanoferrate cathode, a sodium manganese hexacyanomanganate anode, and acetonitrile-based electrolyte with no additive (Control) and various concentrations of adiponitrile.

Figure 3:
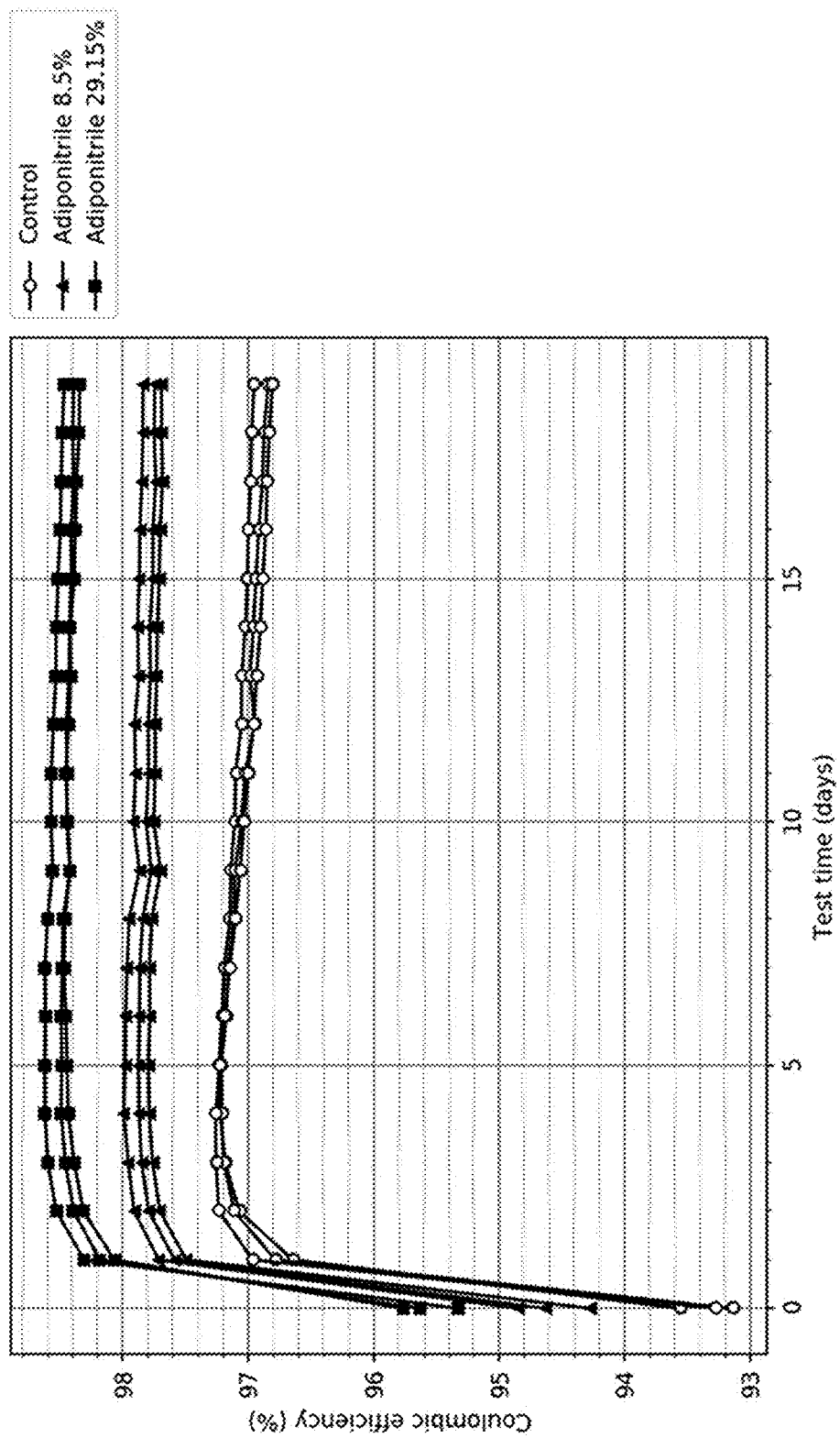
FIG. 3 illustrates coulombic efficiency versus time during float testing.

FIG. 3 illustrates coulombic efficiency versus time during float testing at 1.86V with daily 1 hour discharge to 1.19V at an ambient temperature of 40° C., for cells containing a sodium manganese iron hexacyanoferrate cathode, a sodium manganese hexacyanomanganate anode, and acetonitrile-based electrolyte with no additive (Control) and various concentrations of adiponitrile.

Figure 4:
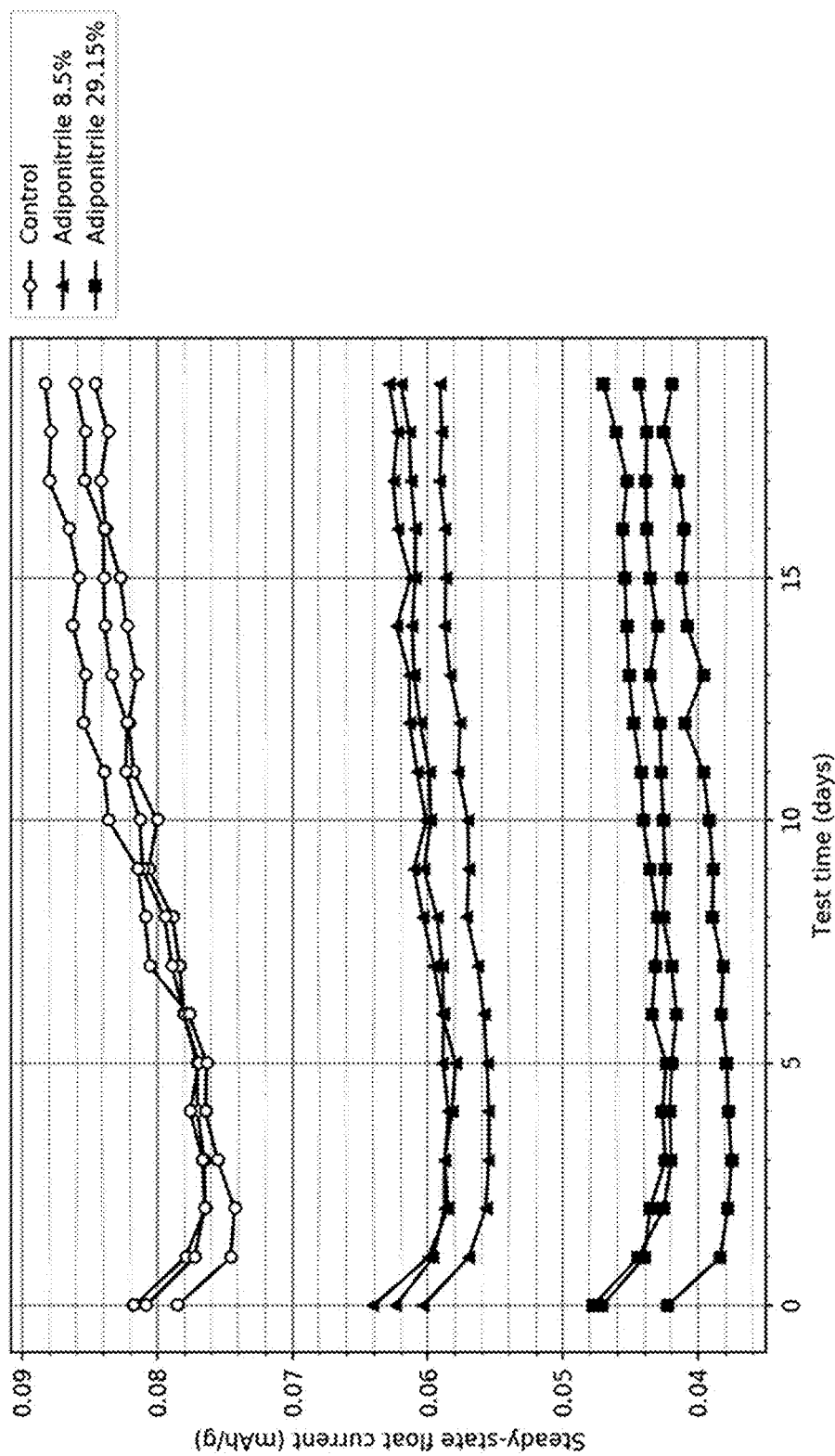
FIG. 4 illustrates steady state float current versus time during float testing.

FIG. 4 illustrates steady state float current versus time during float testing at 1.86V with daily 1 hour discharge to 1.19V at an ambient temperature of 40° C., for cells containing a sodium manganese iron hexacyanoferrate cathode, a sodium manganese hexacyanomanganate anode, and acetonitrile-based electrolyte with no additive (Control) and various concentrations of adiponitrile.

Figure 5:
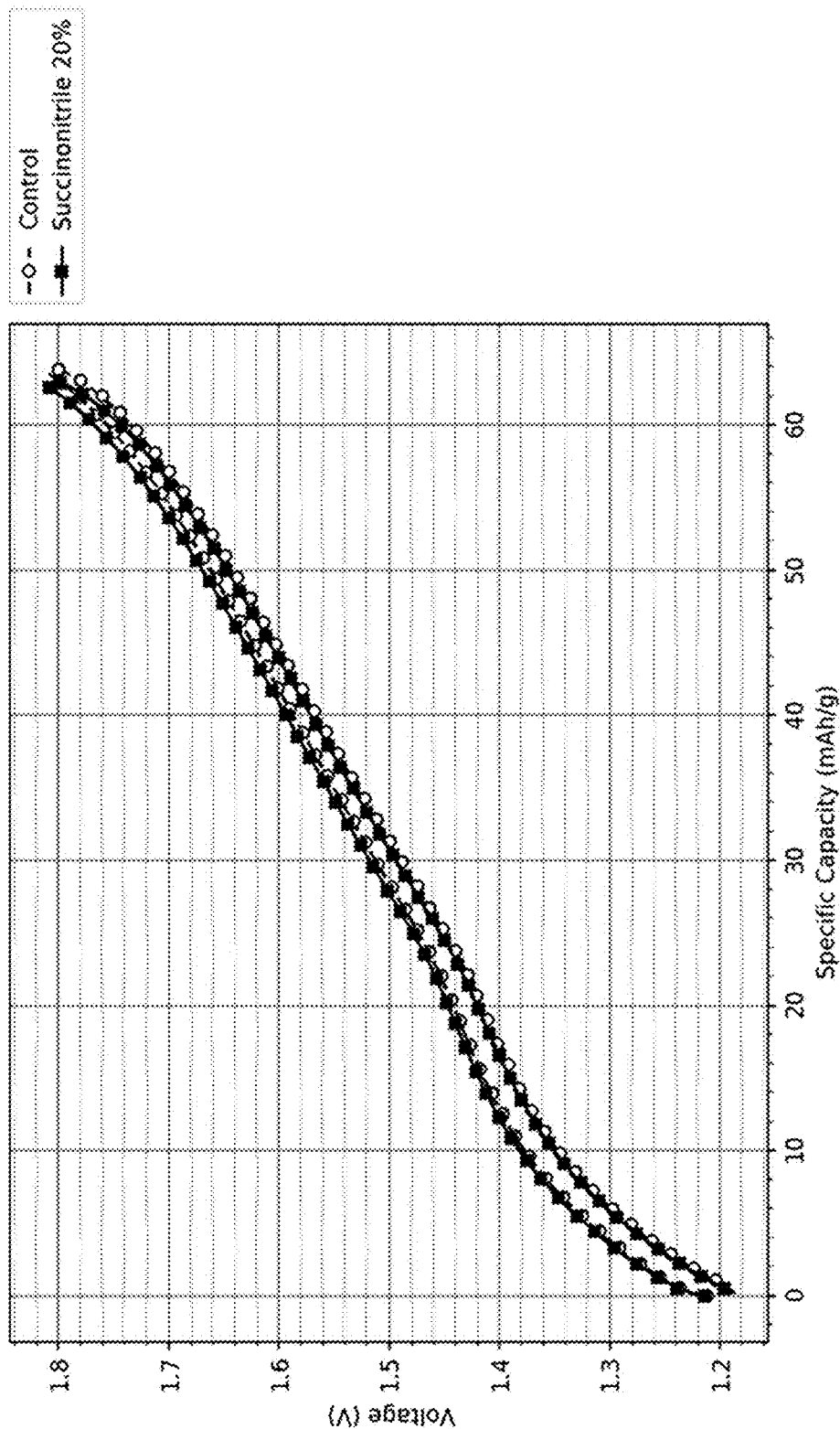
FIG. 5 illustrates 1 C constant-current charge-discharge voltage profiles.

FIG. 5 illustrates 1 C constant-current charge-discharge voltage profiles of cells containing a sodium manganese iron hexacyanoferrate cathode, a sodium manganese hexacyanomanganate anode, and acetonitrile-based electrolyte with or without (Control) a 20% succinonitrile additive.

Figure 6:
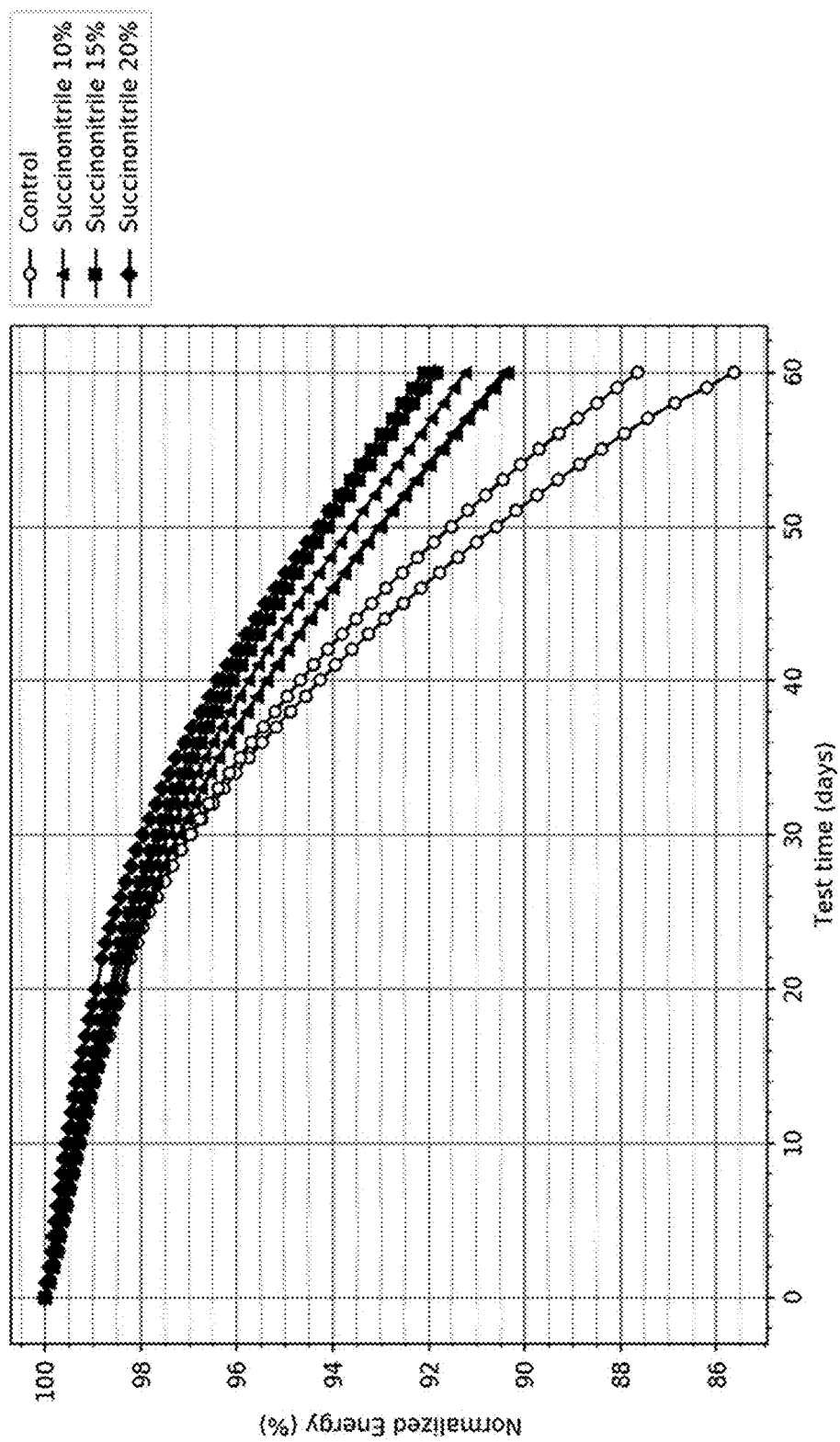
FIG. 6 illustrates cell energy versus time during float testing.

FIG. 6 illustrates cell energy versus time during float testing at 1.81V with daily 1 hour discharge to 1.19V at an ambient temperature of 55° C., normalized to the discharge energy of the first tested cycle, for cells containing a sodium manganese iron hexacyanoferrate cathode, a sodium manganese hexacyanomanganate anode, and acetonitrile-based electrolyte with no additive (Control) and various concentrations of succinonitrile.

Figure 7:
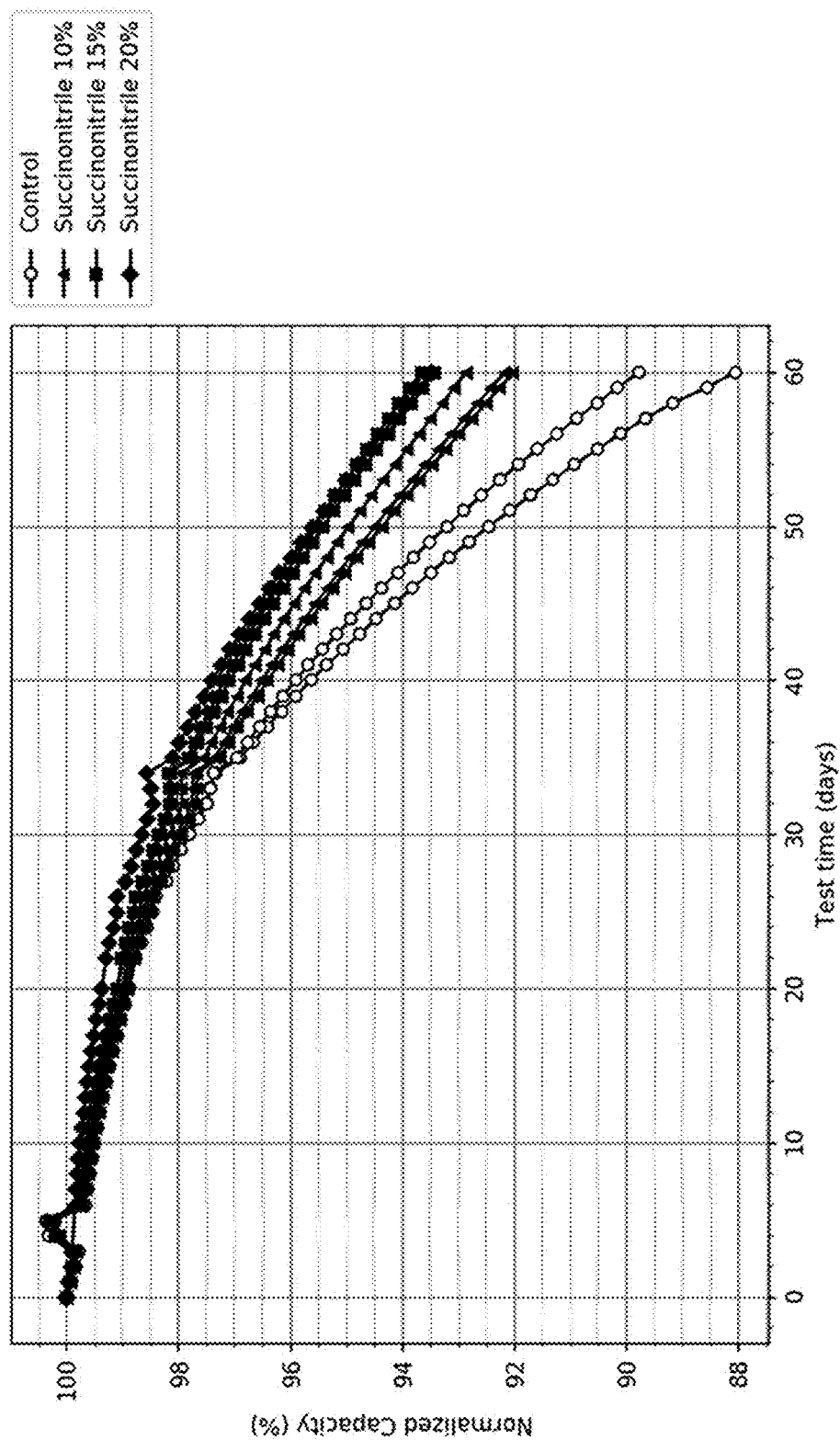
FIG. 7 illustrates cell capacity versus time during float testing.

FIG. 7 illustrates cell capacity versus time during float testing at 1.81V with daily 1 hour discharge to 1.19V at an ambient temperature of 55° C., normalized to the discharge capacity of the first tested cycle, for cells containing a sodium manganese iron hexacyanoferrate cathode, a sodium manganese hexacyanomanganate anode, and acetonitrile-based electrolyte with no additive (Control) and various concentrations of succinonitrile.

Figure 8:
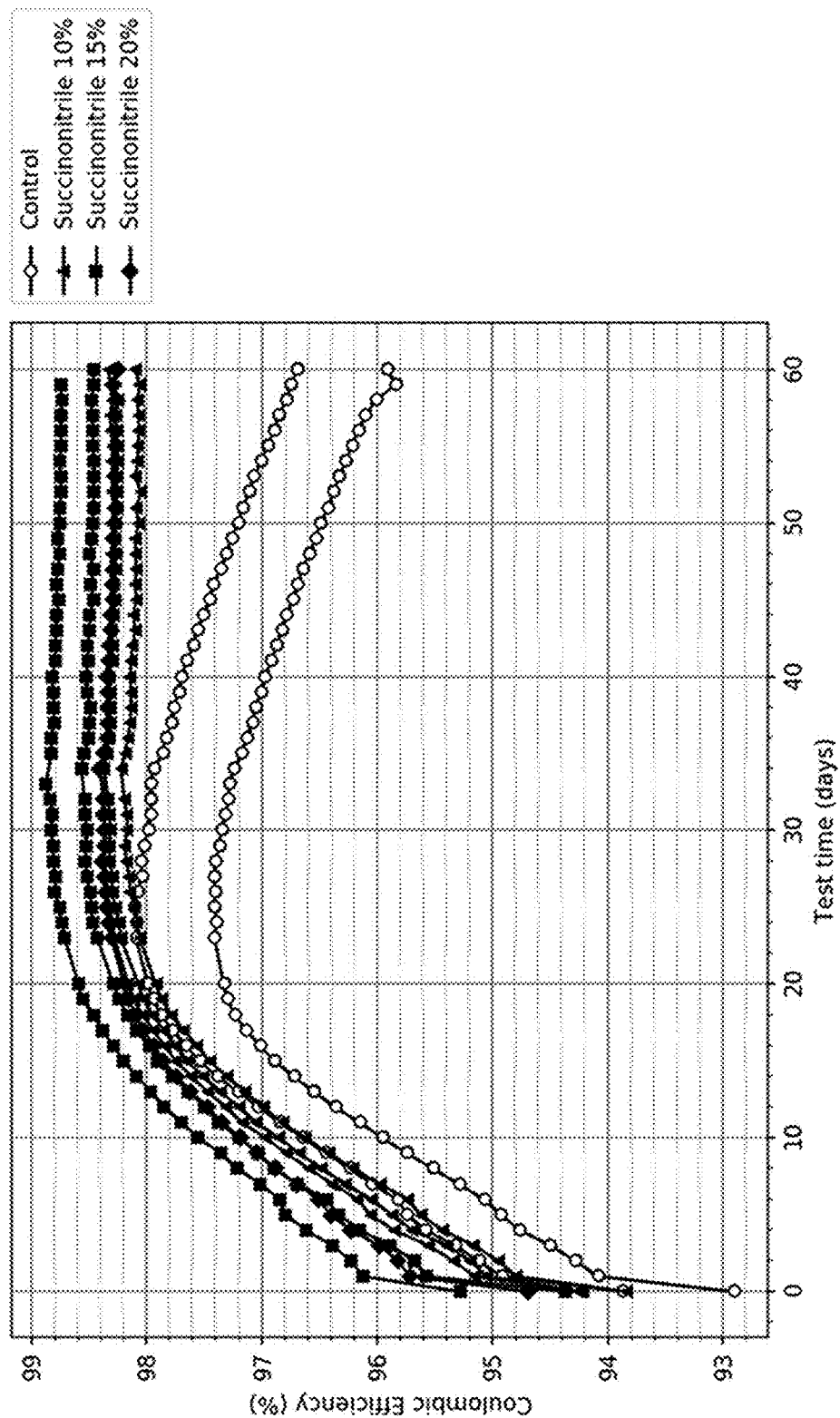
FIG. 8 illustrates coulombic efficiency versus time during float testing.

FIG. 8 illustrates coulombic efficiency versus time during float testing at 1.81V with daily 1 hour discharge to 1.19V at an ambient temperature of 55° C., for cells containing a sodium manganese iron hexacyanoferrate cathode, a sodium manganese hexacyanomanganate anode, and acetonitrile-based electrolyte with no additive (Control) and various concentrations of succinonitrile.

Figure 9:
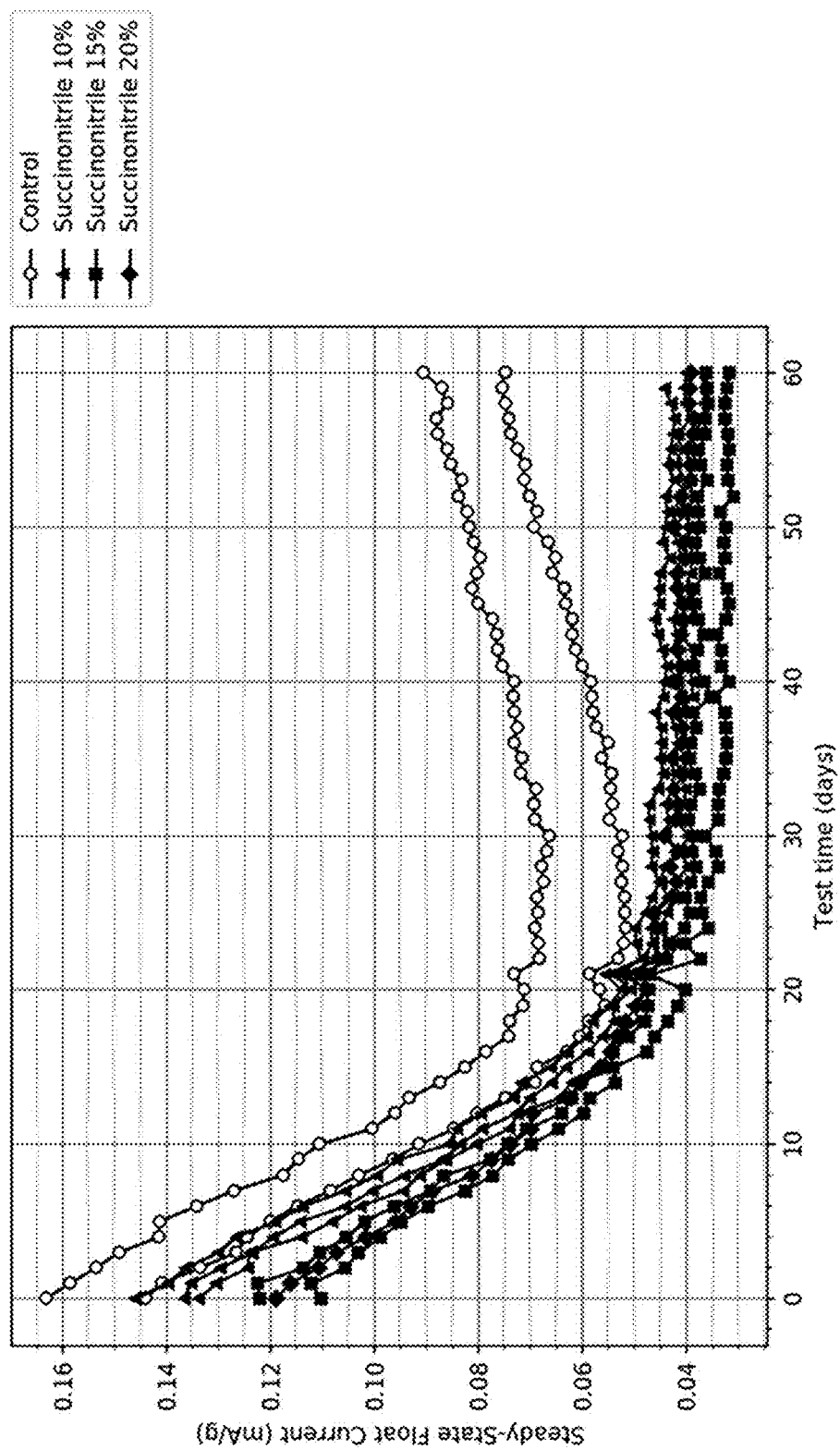
FIG. 9 illustrates steady state float current versus time during float testing.

FIG. 9 illustrates steady state float current versus time during float testing at 1.81V with daily 1 hour discharge to 1.19V at an ambient temperature of 55° C., for cells containing a sodium manganese iron hexacyanoferrate cathode, a sodium manganese hexacyanomanganate anode, and acetonitrile-based electrolyte with no additive (Control) and various concentrations of succinonitrile.

Figure 10:
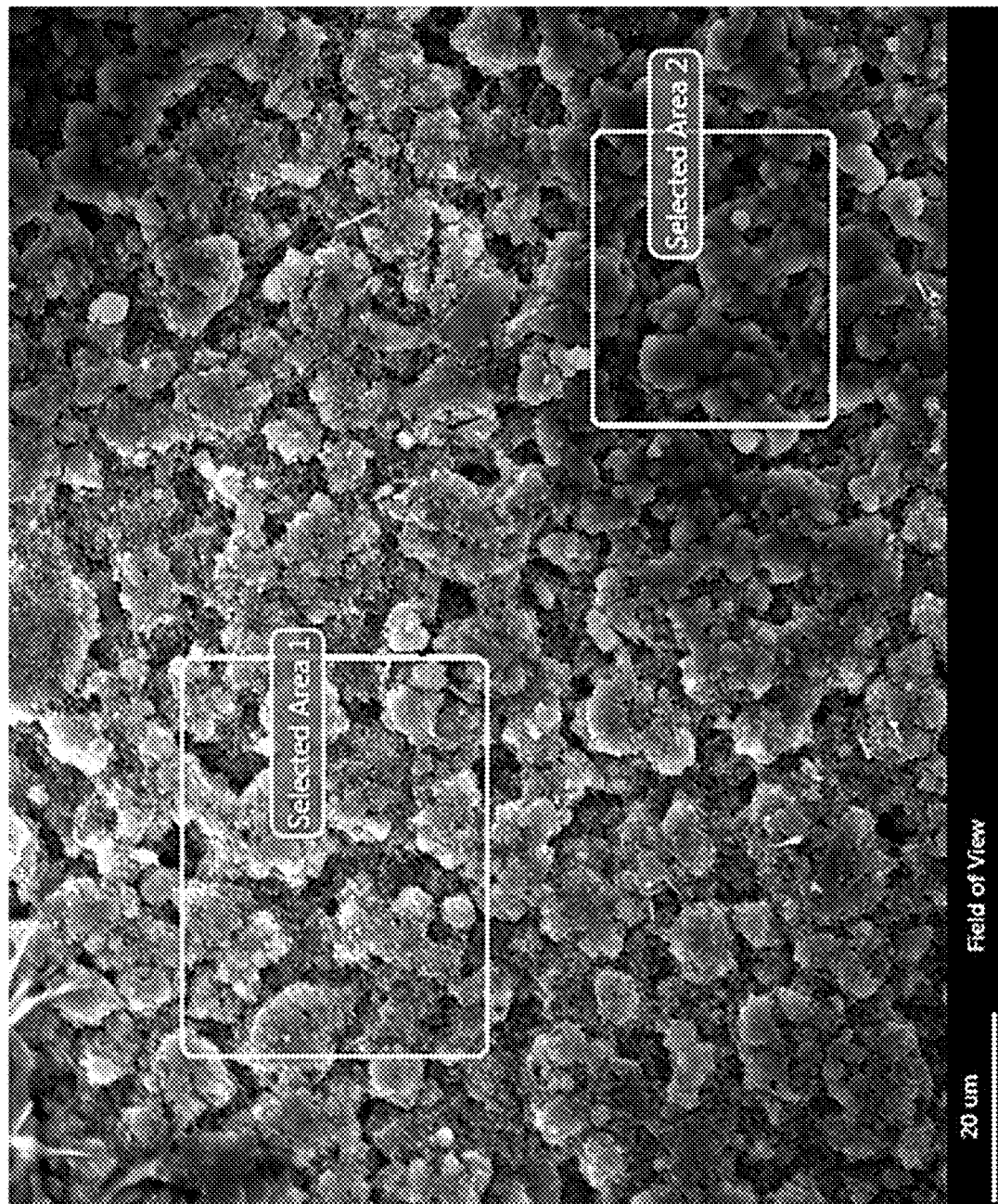
FIG. 10 illustrates a post-mortem SEM image.

FIG. 10 illustrates post-mortem SEM image of a sodium manganese iron hexacyanoferrate cathode taken from a cell containing an acetonitrile-based electrolyte with no additives after 340 days of float testing at 45° C. at 1.86 V. Selected Area 1 and Selected Area 2 mark the regions in which EDX spectra in FIGS. 11 and 12 were recorded, respectively.

Figure 11:
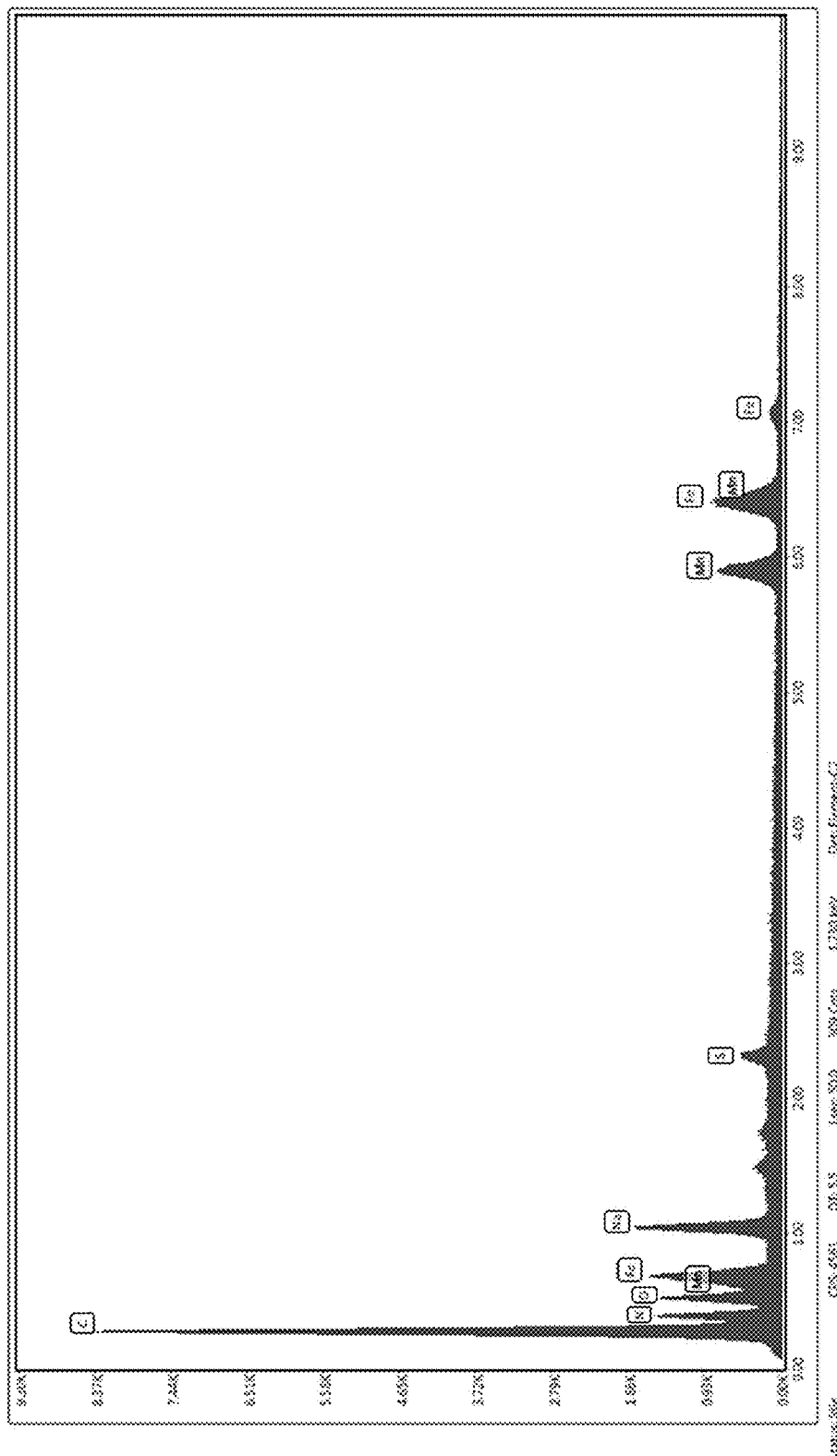
FIG. 11 illustrates an EDX spectrum of Selected Area 1 in FIG. 10.

FIG. 11 illustrates EDX spectrum of Selected Area 1 in FIG. 10, showing the elemental composition characteristic of sodium manganese iron hexacyanoferrate cathode active material with binder and conductive carbon, and sodium bis(trifluoromethanesulfonyl)imide.

Figure 12:
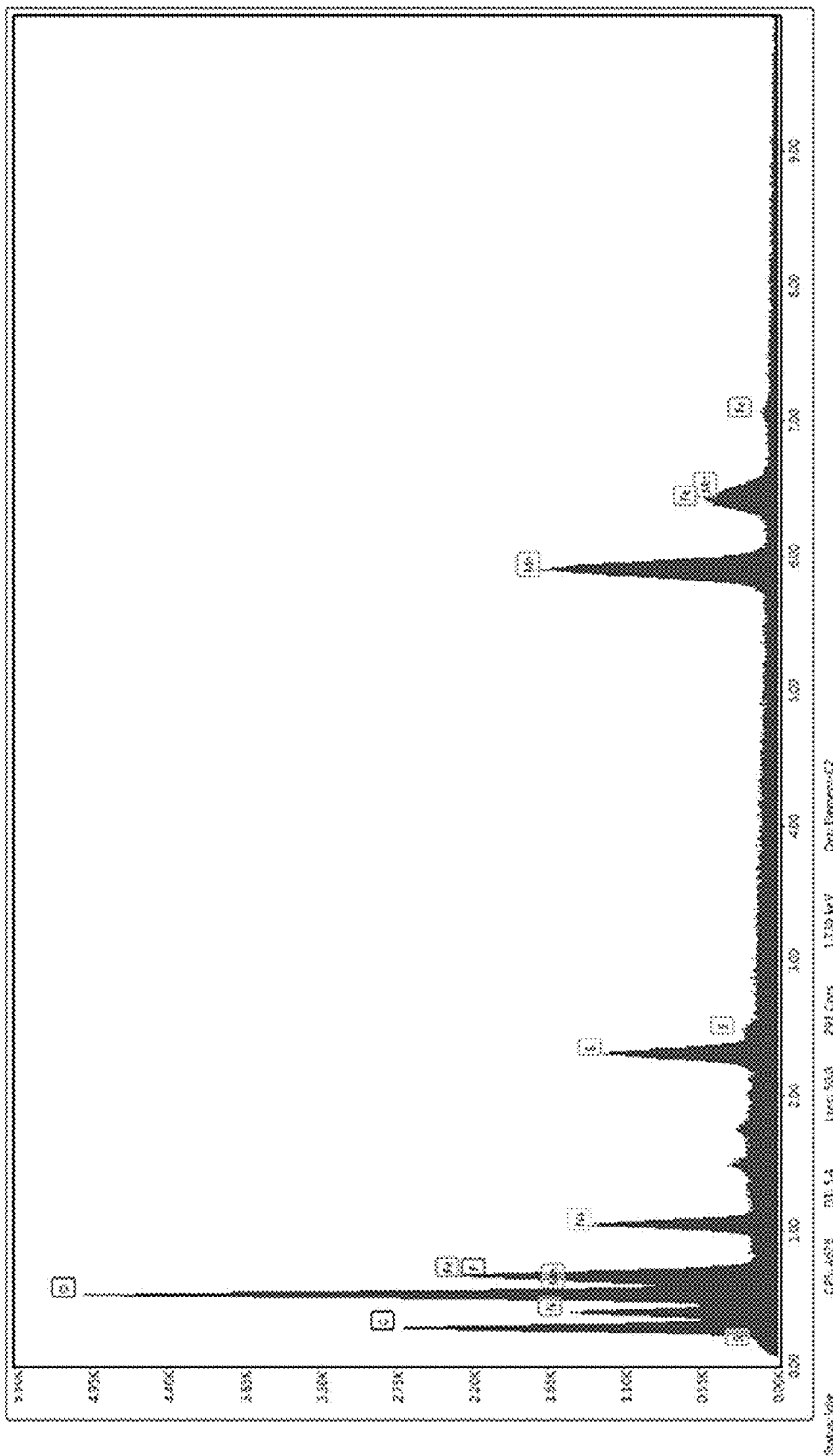
FIG. 12 illustrates an EDX spectrum of Selected Area 2 in FIG. 10.

FIG. 12 illustrates EDX spectrum of Selected Area 2 in FIG. 10, showing the elemental composition characteristic of a sodium manganese iron hexacyanoferrate cathode covered with manganese oxide precipitates, and sodium bis (trifluoromethanesulfonyl)imide.

Figure 13:
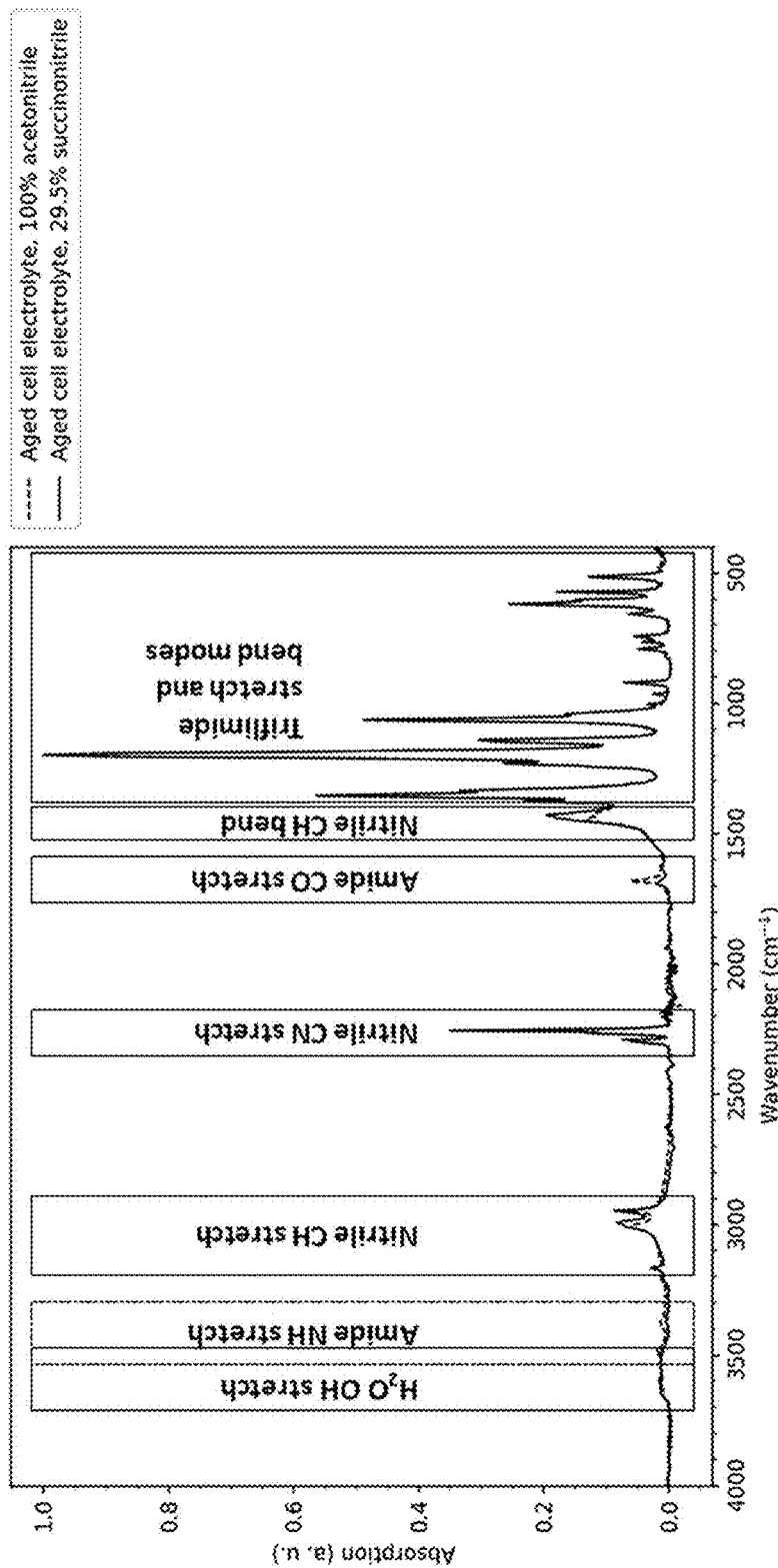
FIG. 13 illustrates an FTIR of electrolyte extracted from aged cells.

FIG. 13 illustrates FTIR of electrolyte extracted from aged cells containing a sodium manganese iron hexacyanoferrate cathode and a sodium manganese hexacyanomanganate anode. One cell was filled with 0.88 M NaTFSI electrolyte made with 100% acetonitrile, the other cell with electrolyte containing 0.88 M NaTFSI in acetonitrile and 29.5% by weight succinonitrile. Both cells had undergone constant-voltage float testing at 1.86 V with daily 1 C constant-current discharge to 1.19 V at an ambient temperature of 45° C. for a duration of 340 days.

Figure 14:
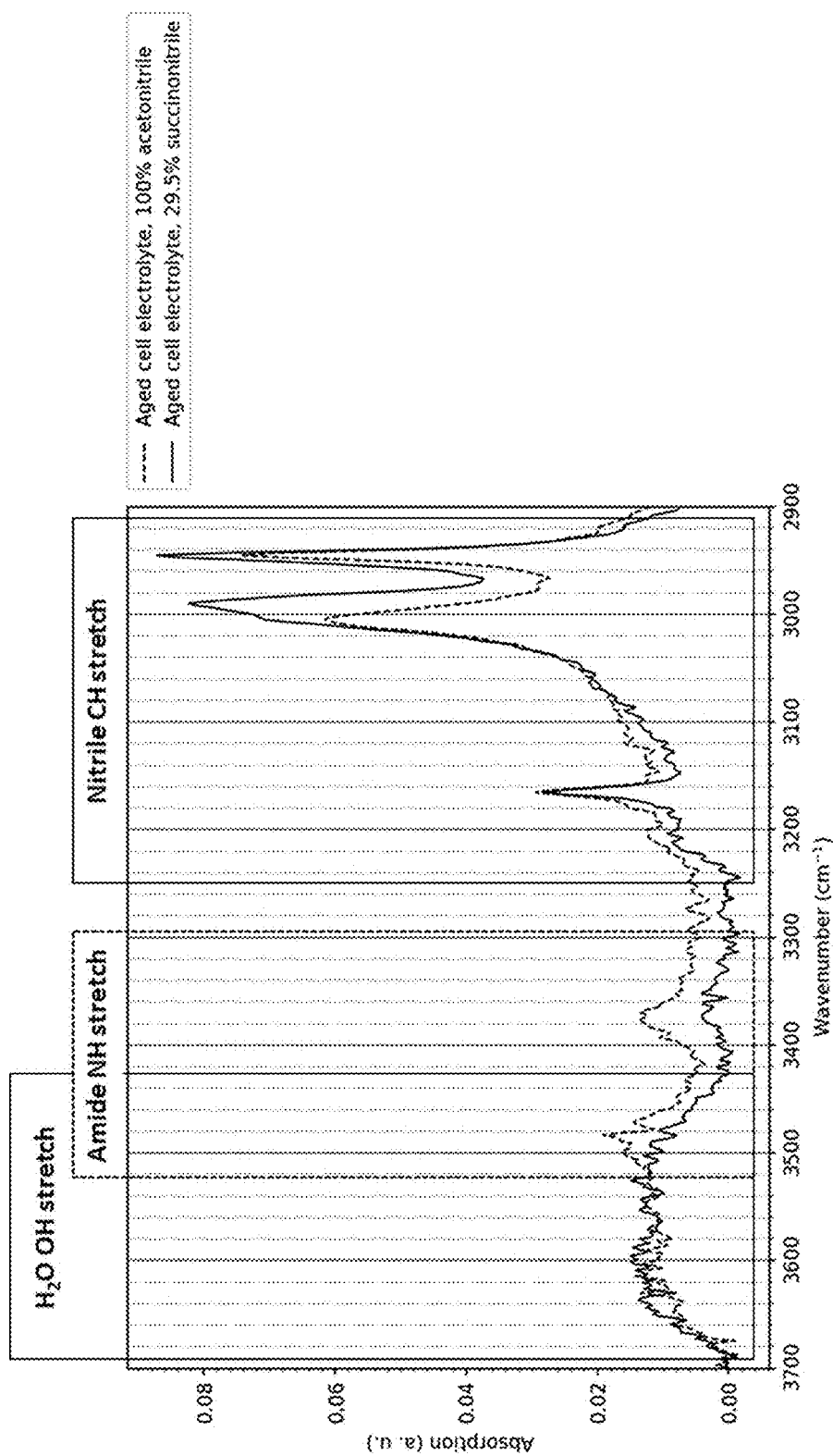
FIG. 14 illustrates a magnified region of the FTIR spectra in FIG. 13.
Figure 15:
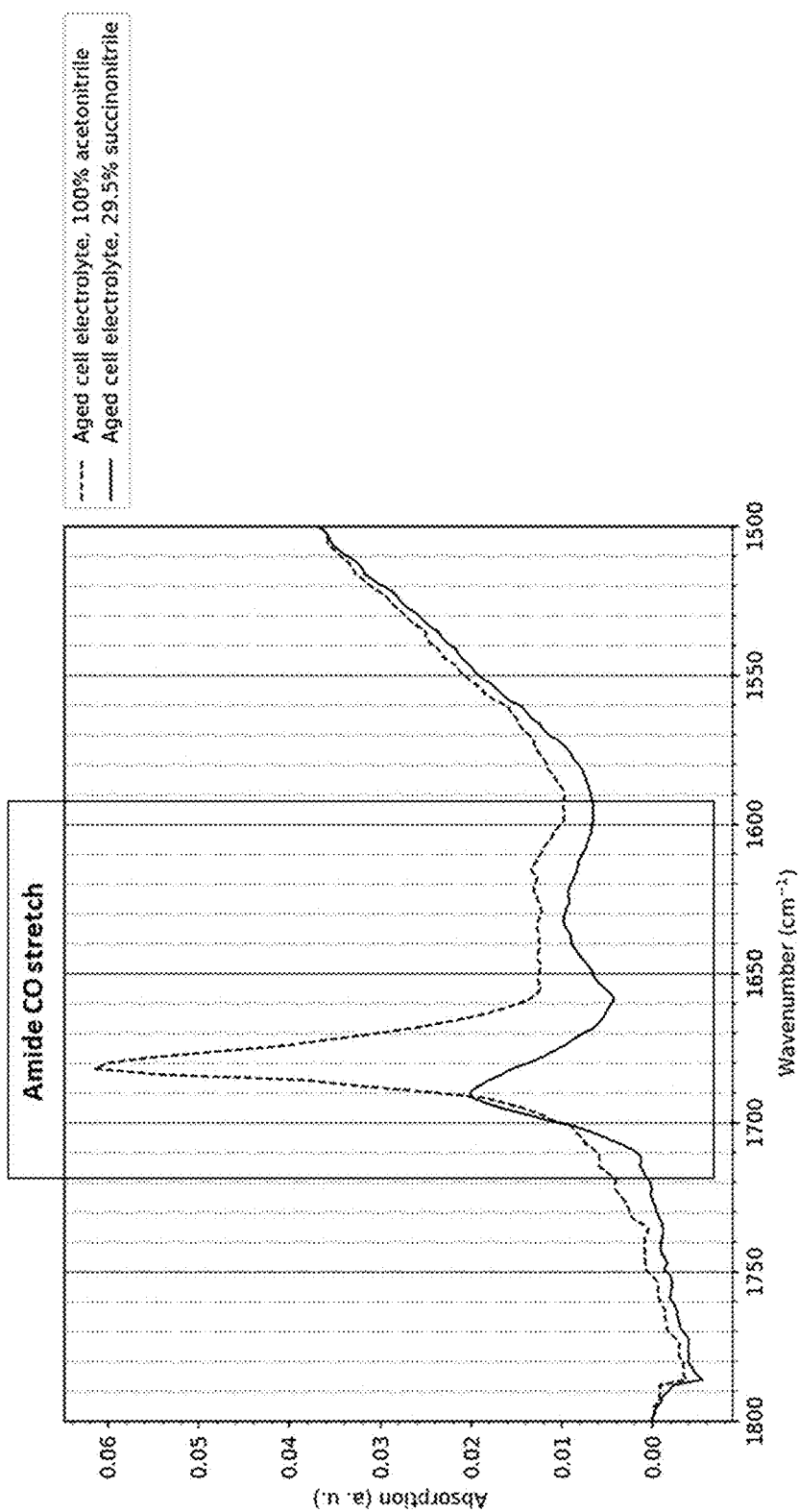
FIG. 15 illustrates a magnified region of the FTIR spectra in FIG. 13.

FIG. 14 illustrates magnified region of the FTIR spectra in FIG. 13, and FIG. 15 illustrates magnified region of the FTIR spectra in FIG. 13.

EXAMPLE 1

Testing of sodium-ion battery cells containing a sodium manganese iron hexacyanoferrate cathode, a sodium manganese hexacyanomanganate anode, and mononitrile-based electrolyte containing adiponitrile additive.

Electrolytes were prepared by mixing acetonitrile with adiponitrile (ADN) to obtain two different adiponitrile concentrations of 8.5% and 29.15% by weight. NaTFSI salt was dissolved in the liquid mixtures to a concentration of 0.88 mol/L. Two groups of otherwise identical pouch cells were filled with the 8.5% ADN and the 29.15% ADN electrolyte, respectively. A third group was filled with a 0.88 mol/L NaTFSI/100% acetonitrile solution to serve as a control group. Anodes and cathodes were carefully selected to minimize differences in mass loadings between cells, and to originate from the same respective material synthesis and electrode coating runs. All cells were subjected to an accelerated aging test, in which the cells were held at a constant ambient temperature of 40° C. and underwent a cycling schedule consisting of constant-current charging at 1 C to a cell voltage of 1.86 V, followed by a 22 h constant-voltage period and then a constant-current discharge at 1 C to 1.19 V. All cells exhibited approximately linear capacity fade over a test duration of 20 days. The cell degradation was slowed down by the addition of adiponitrile, and a monotonic decrease of fade rates with increasing adiponitrile concentration was observed. (FIG. 1 and FIG. 2). Significant improvements of the coulombic efficiency were also achieved. The coulombic efficiency increased monotonically with adiponitrile concentration, from 97% with no additive to 97.8% and 98.5% with 8.5% and 29.15% adiponitrile, respectively (FIG. 3). FIG. 4 illustrates a steady-state float current averaged over the last 2 h of each float sequence, which can be seen as a measure of the parasitic reaction rate. The adiponitrile additive at 8.5% and 29.15% reduces the steady-state float current by approximately 25% and 50%, respectively.

EXAMPLE 2

Testing of sodium-ion battery cells containing a sodium manganese iron hexacyanoferrate cathode, a sodium manganese hexacyanomanganate anode, and mononitrile-based electrolyte containing succinonitrile additive.

Electrolytes were prepared by mixing acetonitrile with succinonitrile (SN) to obtain two different succinonitrile contents of 10%, 15%, and 20% by weight. NaTFSI salt was dissolved in the liquid mixtures to give a salt concentration of 0.88 mol/L. Three groups of otherwise identical pouch cells were filled with the 10% SN, 15% SN, and 20% SN electrolyte, respectively. A fourth group was filled with a 0.88 mol/L NaTFSI/100% acetonitrile solution to serve as a control group. Anodes and cathodes were carefully selected to minimize differences in mass loadings between cells, and to originate from the same respective material synthesis and electrode coating runs. The cells exhibited reversible voltage profiles in 1C constant current charge-discharge cycling, and no significant changes to the characteristic features of the voltage profiles were found between cells with or without a dinitrile additive (FIG. 5). All cells were subjected to an accelerated aging test, in which the cells were held at an ambient temperature of 55° C. and underwent a cycling schedule consisting of constant-current charging at 1C to a cell voltage of 1.81 V, followed by a 22 h constant-voltage period and then a constant-current discharge at 1 C to 1.19 V. The cell degradation was significantly diminished by the addition of succinonitrile, as indicated by the energy and capacity fade (FIG. 6 and FIG. 7), in which cells with succinonitrile additive become clearly distinguishable from the controls after 30 days. The addition of succinonitrile was found to be highly effective at suppressing parasitic reactions, as evident in increased coulombic efficiencies and reduced float currents (FIG. 8 and FIG. 9). In the control cells, low coulombic efficiencies, and high float currents during the initial 20 days of testing indicate high parasitic reaction rates. These parasitic reactions eventually diminish, presumably because water released from at least one of the electrode materials is consumed, but a second parasitic mechanism becomes apparent as the steady-state float current increases again, which coincides with accelerated capacity fade. The succinonitrile additive improves the coulombic efficiency and diminishes the float current, and a monotonic decrease of the float current and a monotonic increase of the coulombic efficiency with succinonitrile concentration are observed. Furthermore, the succinonitrile additive prevents the second stage of cell degradation. After 30 days, the parasitic currents remain at a low level in cells with succinonitrile. In contrast, the cells without additive suffer a steady increase of parasitic current beginning at 25 days, and after 60 days their parasitic currents are 2× as high as in cells with succinonitrile.

EXAMPLE 3

Post-mortem analysis of a sodium-ion battery cell containing a sodium manganese iron hexacyanoferrate cathode and a sodium manganese hexacyanomanganate anode using SEM-EDX.

A post-mortem analysis was performed on one cell made with 29.5% succinonitrile and one cell made without additives. Both cells had undergone constant-voltage float testing at 1.86 V with daily 1 C constant-current discharge to 1.19 V for 340 days. The cells were brought to a voltage of 1.56 V and disassembled under dry nitrogen atmosphere.

This post-mortem analysis included use of scanning electron microscopy imaging (SEM) and energy-dispersive x-ray spectroscopy (EDX) on TMCCC electrodes after operation in electrochemical cells. The composition of these TMCCC electrodes included manganese cations. Characterization using the SEM and EDX techniques provide evidence that manganese oxide precipitates had formed on a TMCCC cathode that was operated in an electrolyte that did not contain dinitrile additives. In another cell, which was made using the identical design except for the electrolyte, which contained a succinonitrile additive in a 70.54:29.46 mass ratio between acetonitrile and succinonitrile (the dinitrile additive), no manganese oxide precipitates were found with SEM-EDX. Thus, the addition of the dinitrile electrolyte additive suppressed the release of manganese cations from the TMCCC electrode and formation of a manganese oxide impurity phase. This suppression is important because the formation of that manganese oxide phase resulted in an increase in the internal resistance of the cell and a decrease in the cell's capacity and energy.

SEM images of the control cathode reveal regions with brighter and darker contrast having otherwise similar surface morphology (FIG. 10). EDX spectra were taken in regions with bright and dark contrast, respectively. EDX found a difference in elemental composition between the brighter and darker. An EDX spectrum taken in a bright region (FIG. 11) shows nearly the same composition as spectra of pristine cathode samples with relative intensities of C, N, O, Na, Mn and Fe fluorescence lines reflecting the composition of the cathode active material and additional contributions from conductive carbon additive and binder to the C fluorescence line. Sulfur and fluorine emission lines are also present since some electrolyte salt remains within the electrodes during sample preparation. A spectrum taken in a region that appears darker in imaging is markedly different (FIG. 12); here, the Fe fluorescence is strongly diminished and the intensities from O and Mn are strongly enhanced. This indicates that in the darker regions the cathode active material is covered with manganese oxide precipitates.

In the SEM-EDX analysis of cathode samples from the cell with 29.5% succinonitrile, no manganese oxide precipitates were detected. This finding supports the hypothesis that dinitrile additives such as succinonitrile suppress the release of manganese cations from the TMCCC electrodes and the formation of metal oxide precipitates.

EXAMPLE 4

ATR-FTIR analysis of electrolyte extracted from a sodium-ion battery cell containing a sodium manganese iron hexacyanoferrate cathode and a sodium manganese hexacyanomanganate anode.

Electrolyte was extracted from each cell in Example 3 using the following procedure: a 3 cm×2 cm section of each electrode was enclosed in a centrifuge vial with an added amount of 0.1 mL acetonitrile. After allowing the added acetonitrile to soak into the electrode, the vial was centrifuged at 6,500 rpm for 20 minutes. ATR-FTIR spectra of the thus obtained liquid extracts were measured using a single-reflection diamond prism.

ATR-FTIR spectra of electrolyte extracted from the aged cells with 0% and 29.5% succinonitrile are illustrated in FIG. 13. All absorption bands in the pristine electrolyte can be assigned to vibrational modes of acetonitrile and of the bis(trifluoromethanesulfonyl)imide anion. Trace amounts of water are also present, as indicated by broad absorption bands at wavenumbers greater than 3400 cm−1 (FIG. 14).

The spectrum of the electrolyte extracted from the aged cell in the control group shows additional bands characteristic of the N—H stretch (3480 cm−1 and 3380 cm−1) (FIG. 13 and FIGS. 14) and C=O stretch modes (1680 cm−1) in acetamide (FIG. 13 and FIG. 15). In the spectrum of electrolyte extracted from the cell with 29.5% succinonitrile, the amide absorption bands are also present but with strongly diminished intensity of approximately 30% compared to the control sample. The C=O stretch mode appears at slightly higher wavenumber (1690 cm−1), which could be explained by the presence of succinonitrile.

The ATR-FTIR spectra reveal the presence of an acetamide impurity in both cells, and that the concentration of acetamide is strongly reduced in the presence of the succinonitrile additive. In a cell containing electrolyte comprised of acetonitrile and succinonitrile in a mass ratio of 70.54:29.46, characterization using ATR-FTIR showed a concentration of acetamide three times lower than in other cells containing an electrolyte containing acetonitrile and no succinonitrile. All cells in this example were otherwise identical, except for the addition of a dinitrile electrolyte additive. No acetamide was initially present in either of these cells. Acetamide is a common reaction product of acetonitrile with water, indicating that water impurities in the cell reacted with the electrolyte solvent during cell operation. This finding has important implications regarding the stability of acetonitrile or other mononitrile electrolytes in electrochemical energy storage devices. A common method of determining stability of a new electrolyte relies on determining its electrochemical stability window; this is typically done by measuring cyclic voltammetry curves of the electrolyte in a three-electrode cell with a chemically inert working electrode such as platinum metal or glassy carbon. The stability window is then taken as the range of electrochemical potentials within which the cyclic voltammetry plot exhibits only small charge-discharge currents associated with the electric double layer capacitance of the working electrode. Using this method, mononitriles were reported to be among those solvents that have the widest electrochemical stability windows. However, this characterization fails to consider side reactions that do not involve oxidation or reduction of nitriles. Our findings in Example 4 show that water, which is the most ubiquitous impurity in anhydrous electrochemical devices, including Li-ion batteries and EDLCs, is capable of decomposing acetonitrile in a reaction that is independent of device voltage. Amides have significantly narrower electrochemical stability windows than their parent nitriles. Therefore, even when water is present only at trace levels, it can set off a chain of parasitic reactions in which amide, or amide oxidation and amide reduction products can continue to activate nitrile solvent molecules. Dinitrile electrolyte additives break this runaway reaction chain at an early stage by suppressing the hydrolysis reaction. By preventing decomposition of the mononitrile electrolyte solvent, the dinitrile additive extends the life of the cell containing trace water impurities.

References: (The following references are discussed herein and are hereby expressly incorporated their entireties by reference thereto.)

R1: U.S. Pat. No. 5,418,682.
R2: U.S. Pat. No. 9,666,906.
R3: WO 2008/138132 A1;
R4: Q. Zhang et al., "Safety-Reinforced Succinonitrile-Based Electrolyte with Interfacial Stability for High-Performance Lithium Batteries" Appl. Mater. Interfaces 2017, 9 (35), 29820;
R5: H. Duncan et al., "Electrolyte Formulations Based on Dinitrile Solvents for High Voltage Li-Ion Batteries" J. Electrochem. Soc. 2013, 160 (6), A838;
R6: A. Abouimrane et al., "Investigation of Li salt doped succinonitrile as potential solid electrolytes for lithium batteries" J. Power Sources 2007, 174, 883; and
R7: T. A. Pham et al., "Solvation and Dynamics of Sodium and Potassium in Ethylene Carbonate from Ab Initio Molecular Dynamics Simulations" J. Phys. Chem. C 2017, 121 (40), 21913.

The systems and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letter of Patent of the United States is:

1. An electrochemical cell, comprising:
    an electrolyte;
    an anode electrode in electrical communication with said electrolyte; and
    a cathode electrode in electrical communication with said electrolyte;
    wherein said cathode electrode includes a first transition metal cyanide coordination compound material; and
    wherein said electrolyte includes an organic solvent, a salt in solution with said solvent, and an additive disposed within said solvent;
    wherein said organic solvent includes a mononitrile solvent;
    wherein said salt includes an alkali cation and a polyatomic anion including fluoride; and
    wherein said additive includes a dinitrile material.

2. The electrochemical cell of claim 1 wherein each said transition metal cyanide coordination compound material includes a composition $A_xP_y[R(CN)_{(6)}]_z \, n(H_2O)$, wherein A includes an alkali metal cation, wherein a P includes a transition metal cation, wherein R includes a transition metal cation, and wherein $0 \leq x \leq 2$, $y=1$, $0.75 \leq z \leq 1$, and $0 \leq n \leq 6$.

3. The electrochemical cell of claim 2 wherein P of said cathode electrode includes at least one of manganese and iron; and wherein R of said cathode electrode includes at least one of manganese and iron.

4. The electrochemical cell of claim 1 in which said dinitrile material includes a linear dinitrile material.

5. The electrochemical cell of claim 4 in which said linear dinitrile material includes succinonitrile.

6. The electrochemical cell of claim 4 in which said linear dinitrile material includes adiponitrile.

7. The electrochemical cell of claim 1 having a weight ratio N of said solvent to said additive wherein $70:30 < N < 99:1$.

8. The electrochemical cell of claim 2 wherein A includes one or more of Li, Na, K, Rb, and Cs cations.

9. The electrochemical cell of claim 1 in which said polyatomic anion includes a fluoridated sulfonimide.

* * * * *